(12) United States Patent
LeVake et al.

(10) Patent No.: US 7,061,514 B2
(45) Date of Patent: Jun. 13, 2006

(54) SCANNING SYSTEM (75) Inventors: Andrew LeVake, Boise, ID (US);
Rulon Gregory Esplin, Meridian, ID (US); Jeffrey L. Trask, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 355 days.

(21) Appl. No.: 10/769,644

(22) Filed: Jan. 30, 2004

(65) Prior Publication Data

US 2005/0168559 A1   Aug. 4, 2005

(51) Int. Cl.
*B41J 2/447* (2006.01)
*G03G 15/01* (2006.01)

(52) U.S. Cl. ........................... 347/116; 399/301
(58) Field of Classification Search ............... None
See application file for complete search history.

(56) References Cited

U.S. PATENT DOCUMENTS

| | | | |
|---|---|---|---|
| 4,878,063 A | 10/1989 | Katerberg | |
| 5,574,491 A | 11/1996 | Paoli | |
| 5,841,459 A | 11/1998 | Wen | |
| 6,038,053 A | 3/2000 | Kato | |
| 6,141,031 A | 10/2000 | Nowak et al. | |
| 6,229,555 B1 | 5/2001 | Hadady et al. | |
| 6,266,073 B1 | 7/2001 | Yergenson | |
| 6,359,640 B1 | 3/2002 | Ravitz et al. | |
| 6,563,524 B1 | 5/2003 | Regimbal et al. | |
| 6,573,919 B1 * | 6/2003 | Benear et al. | 347/116 |
| 2003/0052959 A1 | 3/2003 | Fujimoto | |
| 2003/0085984 A1 | 5/2003 | Ream et al. | |

* cited by examiner

*Primary Examiner*—Huan Tran (57) ABSTRACT

According to one embodiment, a scanning system includes a first light source configured to emit a first light beam, a second light source configured to emit a second light beam, a first sensor configured to detect a position of at least one of the first and the second light beams with respect to a photoconductor, a second sensor configured to provide positional information of a transfer system, and a control system coupled with the first sensor and the second sensor and configured to select one of the first light source and the second light source to form a first scan line of a latent image on the photoconductor responsive to output of the first sensor and the second sensor.

39 Claims, 5 Drawing Sheets

SCANNING SYSTEM

BACKGROUND

Color imaging devices are becoming increasingly popular as the desire for color imaging capabilities continues to increase. For example, personal imaging of color photographs, documents, graphics, etc. is becoming increasingly popular. Inkjet printer and color laser printer designs have made remarkable progress in an effort to accommodate the desire for improved color imaging capabilities.

As opposed to monochrome laser printers, some color laser printers use a plurality of different colors of toner to generate color planes which may be superimposed upon one another to create a final outputted image. These designs present challenges of alignment of the color planes with respect to one another as closely as possible in order to obtain the best print quality. Color plane registration (CPR) error results when certain planes do not exactly match up with one another degrading print quality.

DETAILED DESCRIPTION

Figure 1:
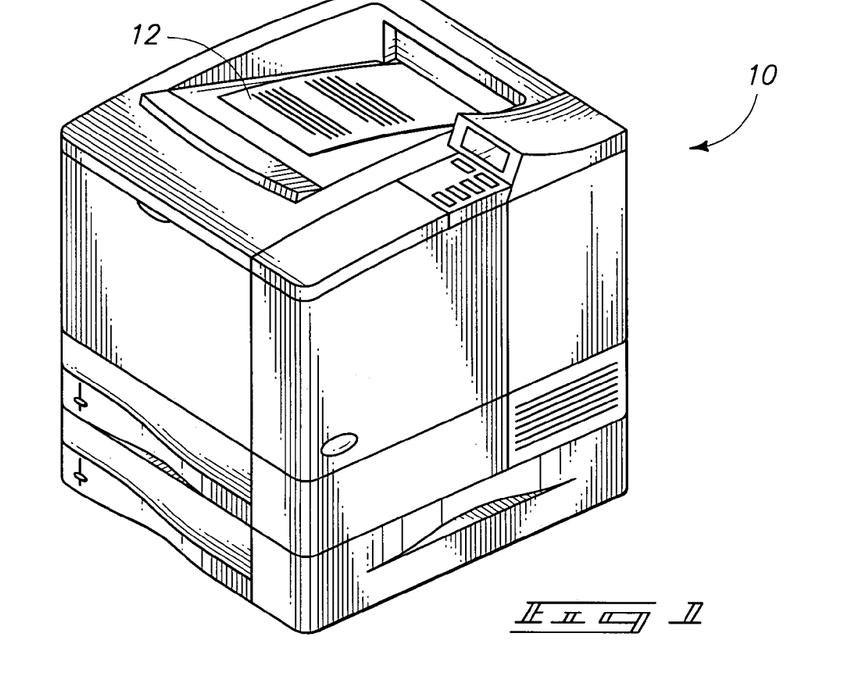
FIG. 1 is an isometric view of an imaging device according to one embodiment.

Referring to FIG. 1, an exemplary imaging device 10 is shown. Imaging device 10 is configured to generate images upon output media 12, such as sheets of paper, transparencies, envelopes, etc. Imaging device 10 may comprise a printer, copier, multiple function peripheral, facsimile machine, or any other device configured to generate images.

In one embodiment, imaging device 10 is configured to implement an electrophotographic printing process to form a plurality of images which are physically rendered upon output media. Imaging device 10 may comprise a color laser printer configured to generate a plurality of color planes and to superimpose the color planes with respect to one another to create a color image. In such an exemplary configuration, imaging device 10 may develop an entirety of a plurality of latent images to generate a color image for a single sheet or piece of media 12. Additional details regarding exemplary imaging operations of imaging device 10 arranged according to one embodiment are described below. Other configurations are possible for creating images.

Figure 2:
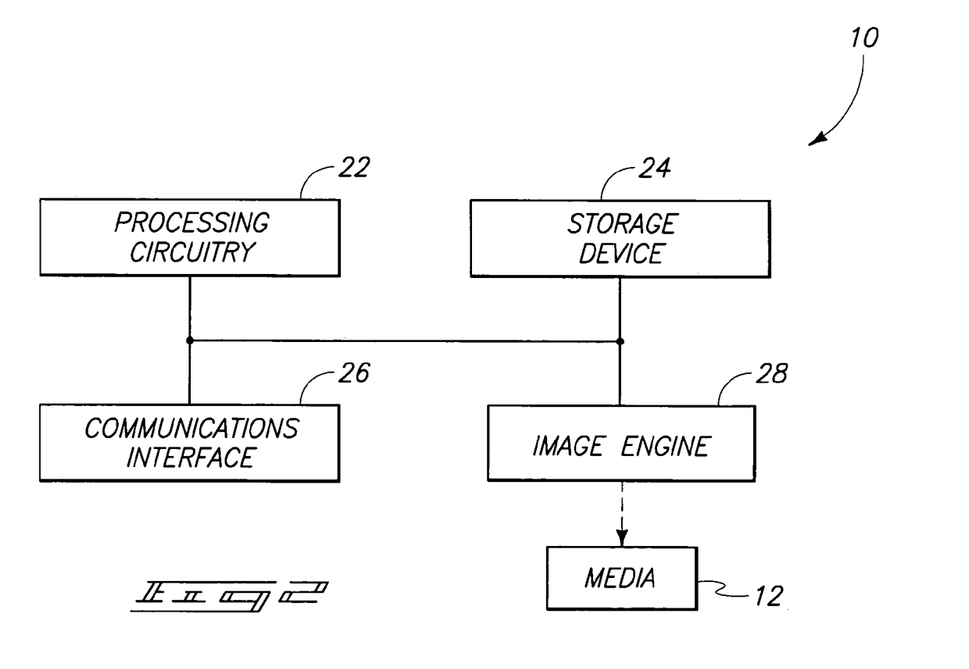
FIG. 2 is a functional block diagram of an imaging device according to one embodiment.

Referring to FIG. 2, imaging device 10 may include processing circuitry 22, a storage device 24, a communications interface 26, and an image engine 28 in one embodiment.

Processing circuitry 22 may comprise circuitry configured to implement desired programming in one embodiment. For example, the processing circuitry may be implemented as a processor or other structure configured to execute executable instructions including, for example, software and/or firmware instructions. Other exemplary embodiments of processing circuitry 22 may include or comprise hardware logic, PGA, FPGA, ASIC, and/or other structures. These examples of processing circuitry 22 are for illustration and other configurations are possible. According to some exemplary embodiments, processing circuitry 22 may control operations of device 10 and be referred to as a control system described below.

Storage device 24 is configured to store electronic data and/or programming such as executable instructions (e.g., software and/or firmware), data, or other digital information and may include processor-usable media. Processor-usable media includes any article of manufacture which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

Communications interface 26 is configured to provide connectivity of imaging device 10 with respect to external devices, such as host computing systems, servers, etc. Communications interface 26 may be embodied as a parallel port, network interface card (NIC) or any other configuration to implement external communications of device 10.

Image engine 28 comprises an electrophotographic color print engine configured to render color images upon output media 12 in one embodiment. As described further below, image engine 28 is configured to develop a plurality of latent images for respective colors (i.e., forming respective developed images of individual colorants also referred to as color planes) and to superimpose the developed images or color planes over one another to form color images in one embodiment.

Figure 3A:
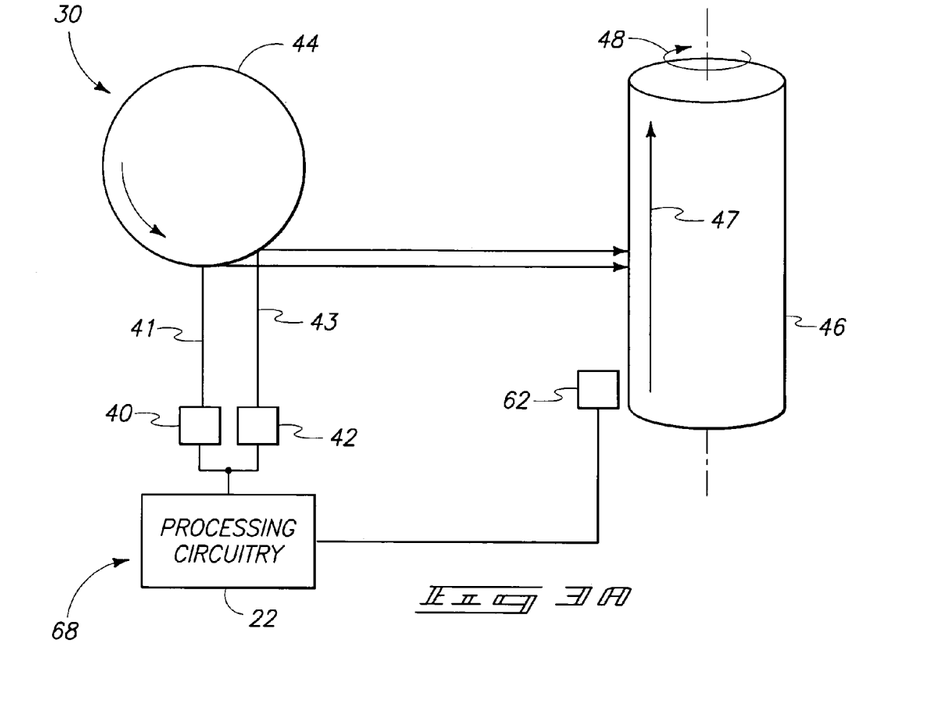
FIG. 3A is an illustrative representation of exemplary scanning operations of an imaging device according to one embodiment.
Figure 3B:
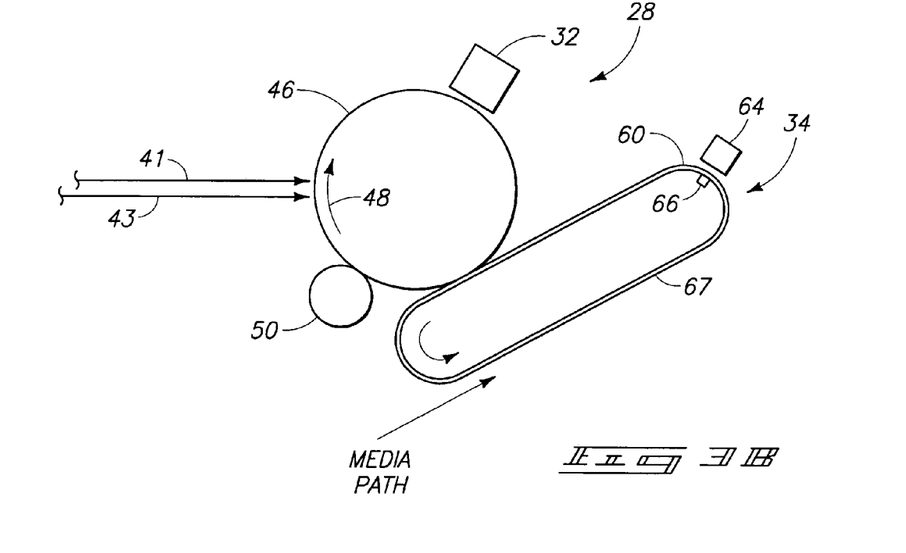
FIG. 3B is an illustrative representation of exemplary transfer and development operations of an imaging device according to one embodiment.

Referring to FIGS. 3A and 3B, additional details regarding formation and development of latent images using image engine 28 according to one implementation are described. The exemplary image engine comprises a scanning system 30, a development system 32, and a transfer system 34 according to an exemplary electrophotographic embodiment. A plurality of sensors 62, 64 are also provided in the exemplary embodiment as described below to enable processing circuitry 22 to control and monitor imaging operations.

FIGS. 3A and 3B illustrate different views of the respective components of imaging device 10. For example, photoconductor 46 rotates in a process direction 48 during imaging operations. In FIG. 3A, the process direction 48 is about an axis of rotation aligned with the y axis, and in FIG. 3B, the process direction is about an axis of rotation aligned with the z axis.

Scanning system 30 includes a plurality of light sources 40, 42, and a scanning device 44 in the depicted exemplary embodiment. Light sources 40, 42 are individually configured to emit respective light beams 41, 43 during scanning operations of latent images for the formation of images upon media 12. Light sources 40, 42 may comprise lasers in one embodiment. In one embodiment, processing circuitry 22 controls pulse width modulation of light beams 41, 43 to provide rasterized information or data of the latent images to be formed. As described below, light sources 40, 42 may simultaneously emit light beams 41, 43 to simultaneously provide a plurality of alternating scan lines of a latent image being formed. Scanning device 44 is configured to scan the light beams 41, 43 upon a photoconductor 46 during the formation of latent images upon photoconductor 46. Scanning device 44 may comprise a rotating polygonal mirror in one embodiment for scanning the light beams 41, 43 upon photoconductor 46. As shown in FIG. 3A, scanning device 44 and light sources 40, 42 scan light beams 41, 43 across photoconductor 46 in a scan direction 47 to form alternating scan lines upon photoconductor 46. In at least one embodiment, scanning system 30 may be considered to also include processing circuitry 22 and sensors 62, 64 as described below.

In the exemplary embodiment of FIGS. 3A and 3B, light sources 40, 42 may be offset in the x direction as shown in FIG. 3A. The x direction offset spacing configures light beam 43 to impinge first upon photoconductor 46 before light beam 41 during rotation of photoconductor 46 in the process direction 48. Light sources 40, 42 may also be offset in the z direction with respect to one another to control the linewidth spacing of scan lines formed by beams 41, 43. For example, in the embodiment of FIG. 3A, light source 42 may be offset towards the reader in the positive z axis direction a distance equal to the desired linewidth spacing. Other configurations are possible.

Development system 32 is configured to develop latent images formed upon photoconductor 46. A charging system 50 may be used to provide an electrical charge to a photoconductive surface of photoconductor 46 and which is subsequently selectively discharged by light beams 41, 43 to form the latent images. According to the exemplary described embodiment, development system 32 is configured to develop the latent images using marking agents of a plurality of colorants (e.g., CMYK) providing respective color planes. For example, a first latent image may be developed using a first colorant and the developed image or color plane may be transferred to a transfer belt 60 of transfer system 34. The development and transfer is repeated for the remaining colorants in respective individual scanning, development and transfer operations of the image engine 28 for the respective colorants. In one embodiment, an entirety of one latent image for a single sheet of media 12 is developed using a respective colorant marking agent before development of an entirety of another latent image using another colorant marking agent for the same single sheet of media 12.

Transfer system 34 is configured to transfer marking agents of developed latent images to media 12. As described above, transfer system 34 may comprise transfer belt 60 configured to receive the developed images. Transfer belt 60 receives the developed images, or color planes, superimposed upon one another. A sheet of media 12 (not shown) travels along the media path and receives the superimposed developed image from transfer belt 60 following development of the color planes for the image.

The illustrated exemplary embodiment of FIGS. 3A and 3B also includes sensors 62, 64. Sensors 62, 64 are arranged to provide alignment information of photoconductor 46 and transfer belt 60 in one embodiment. In one exemplary embodiment, sensor 62 is configured to provide positional information of the light beams 41, 43 with respective to photoconductor 46. In the illustrated example, sensor 62 is oriented to provide beam detect information corresponding to the locations of beams 41, 43 with respect to photoconductor 46 and may be referred to as a beam detect sensor. In one embodiment, sensor 62 is located to provide positional information of a beginning of a scan line to provide timing information to processing circuitry 22 to signal timing for initiating the appropriate writing of information for the respective scan line. Other configurations of sensor 62 are possible including being located at other positions to provide different positional information of scan lines being scanned or otherwise provide information of beams 41, 43 in a horizontal scan cycle of photoconductor 46.

Sensor 64 is configured to provide positional information of transfer belt 60. For example, transfer belt 60 may include a positional marker 66 located at a desired position of transfer belt 60. Sensor 64 may be configured to detect the presence of positional marker 66 to provide information regarding the position of transfer belt 60. In one example, positional marker 66 is provided to signal a top of a page of color planes or a sheet of media 12 in the media feed or process direction, and sensor 64 may be referred to as a top of page sensor in such an example. The positional information may be utilized for alignment to superimpose the color planes upon one another. For example, using the top of page indication, processing circuitry 22 may control the provision of a first line of a developed image upon belt 60 at a location 67. To reduce color plane registration error, it is desired to form the first line of a subsequent developed image at a position closest to location 67. The position of location 67 may be determined by counting a desired number of beam detect signals from sensor 62 after the reception of a top of page signal (corresponding to two line-widths per two beam detect signals in one embodiment). The resolution may be increased to a single line-width using the exemplary embodiment described below to reduce color plane registration error. Other arrangements of sensor 64 are possible including detecting other portions of belt 60, or providing positional information in different ways.

In one arrangement, processing circuitry 22 is configured as control system or a control system 68 to control emission of light beams 41, 43 from sensors 62, 64 and to control selection of one of the plural light sources 40, 42 to provide a light beam for the first scan line comprising data or information of a latent image being scanned upon photoconductor 46. Monitoring, analysis and control operations of control system 68 may be implemented in hardware and/or execution programming arrangements of processing circuitry 22 or in other circuitry in exemplary embodiments.

In one embodiment, the selection of one of the light sources 40, 42 to emit the light beam for a first scan line of information also dictates which light sources 40, 42 are used to generate other remaining scan lines for the respective latent image. For example, if a given one of the light sources 40, 42 is selected to generate a first scan line comprising information for a given latent image, then the one light source also generates the odd scan lines of the given latent image and the other of the light sources 40, 42 scans the even scan lines of the given latent image. Thereafter, for another latent image (e.g., of the same color image to be formed upon a single sheet of media 12), the control system 68 may select the other of the light sources 40, 42 to generate the first and odd scan lines and select the one of the light sources 40, 42 to generate the even scan lines. According to one embodiment, control system 68 may select a different one of the light sources 40, 42 to generate the first scan line of information of individual latent images.

As illustrated, control system 68 may access outputs of sensors 62, 64 to monitor positional information of one or more of light beams 40, 42 and transfer belt 60. Control system 68 may process the positional information to select one or the other of the light sources 40, 42 to image the first scan lines for individual ones of the latent images being scanned in order to reduce color plane registration error due to misalignment of color planes with respect to one another. In one embodiment, processing of outputs of sensors 62, 64 permits control system 68 to monitor alignment of latent images upon photoconductor 46 with respect to transfer belt 60 (e.g., including developed images formed thereon) of transfer system 34 and to control the selection of the light beams 41, 43 responsive to the monitoring to reduce color plane registration error.

Figure 4:
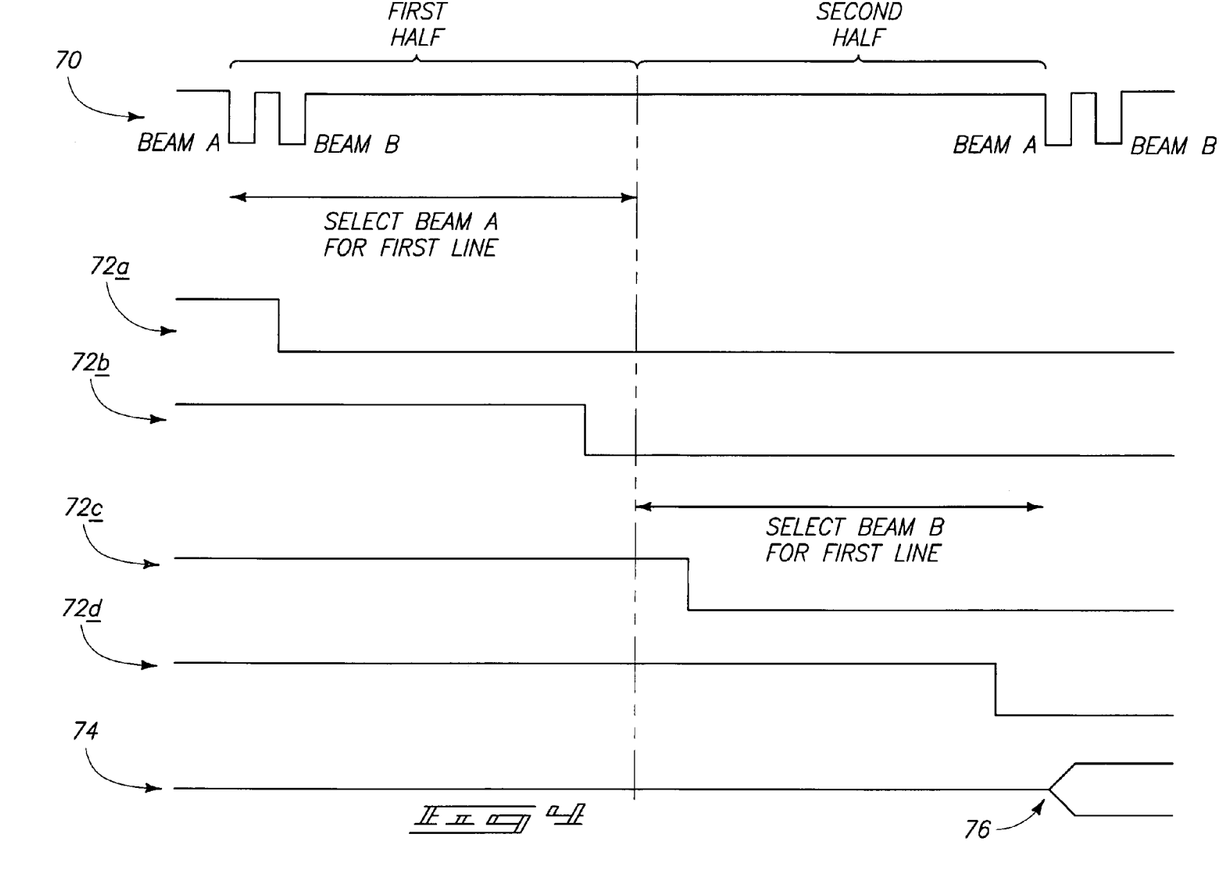
FIG. 4 is a timing diagram illustrating exemplary selection of a plurality of light sources of an imaging device according to one embodiment.

Referring to FIG. 4, additional details regarding selection of the light sources 40, 42 responsive to alignment of the photoconductor 46 and transfer belt 60 according to one embodiment are described. In the described exemplary configuration, sensor 62 may be configured to indicate positioning of light beams 41, 43 at the start of scan lines in line 70 as described above to initiate writing of data by processing circuitry 22 for the respective scan lines, and sensor 64 is configured to indicate top of page positioning of color pages as described above.

The timing diagram of FIG. 4 illustrates a line 70 corresponding to a beam detect signal of the output of sensor 62. A plurality of lines 72a–72d are also illustrated which correspond to top of page signals (i.e., detection of top of page indicated as falling edge in the illustrated example) of the output of sensor 64 representing different exemplary alignment scenarios of photoconductor 46 and transfer belt 60. The selection decision of the light sources 40, 42 to emit the light beam to generate information of the first scan line of the latent image being formed is represented by line 74 at position 76. Light beams A, B may be considered to correspond to light beams 41, 43 of light sources 40, 42, respectively, in the described embodiment.

In one embodiment, control system 68 selects one of the light sources 40, 42 which would yield the formation of the first line of the next color plane be formed closest to the first line of the previously formed color plane already present upon belt 60 to reduce color plane registration error. In the example of FIG. 3B, the control system 68 selects the one of the light sources 40, 42 which would result in the formation of the first line for the next color plane at a position closest to location 67. In one configuration, control system 68 is configured to monitor or determine in which half of a horizontal laser scan cycle (e.g., horizontal laser scan cycle may defined as the time intermediate two beam detect signals for the same beam (e.g., beam A)) a first scan line of a previous latent image occurs corresponding to location 67 in the example of FIG. 3B. In one embodiment, this is determined by measuring the time passed between the output of sensor 64 indicating the top of page positioning and the beginning of the next horizontal scan cycle determined by the output of sensor 62. In another embodiment; the timing is measured from individual beam detect signals to the receipt of the top of page signal. The timed result may be compared with a register (e.g., not shown but may be embodied within processing circuitry 22) indicating the half cycle time of respective scan lines. The comparison by control system 68 determines which light source 40, 42 is closer to the first scan line of data of the previous color plane.

In FIG. 4, lines 72a and 72b representing exemplary top of page signals would result in a time greater than that of the half-cycle time and therefore indicate that beam A of light source 42 should be selected to generate the first scan line comprising data of the latent image being formed (e.g., the time from the falling edge of top of page indications 72a, 72b to the subsequent falling edge of the beam A detect signal exceeds the half-cycle time). Lines 72c and 72d representing exemplary top of page signals would result in a time less than that of the half-cycle time and therefore indicate that beam B should be selected to generate the first scan line comprising data of the latent image being formed (e.g., the time from the falling edge of top of page indications 72c, 72d to the subsequent falling edge of the beam A detect signal is less than the half-cycle time). Line 74 indicates the selection of the appropriate light source 40, 42 at a position 76 responsive to the analysis. For increased flexibility, the horizontal scan half-cycle time may be programmable or dynamically measured in exemplary embodiments. According to at least one described arrangement, control system 68 selects the desired one of the light sources 40, 42 to generate the first scan line of a current latent image responsive to output of sensors 62, 64 following the formation of another latent image immediately preceding the current latent image to be scanned. Counting plural beam detect signals during a single scan cycle provides a resolution of two line-widths with respect to imaging a first line closest to location 67 of FIG. 3B (e.g., the maximum distance of the middle of the line from location 67 is +/−1 line-width). A resolution of a single line-width (e.g., the maximum distance of the middle of the line from location 67 is +/−0.5 line-widths) is achieved by the above-described exemplary analysis of time intermediate the beam detect and top of page signals with respect to the halves of the horizontal scan cycle and the corresponding selection of an appropriate one of the light sources 40, 42 to generate the first scan line responsive to the determined time in one embodiment. Other selection embodiments are possible.

Figure 5:
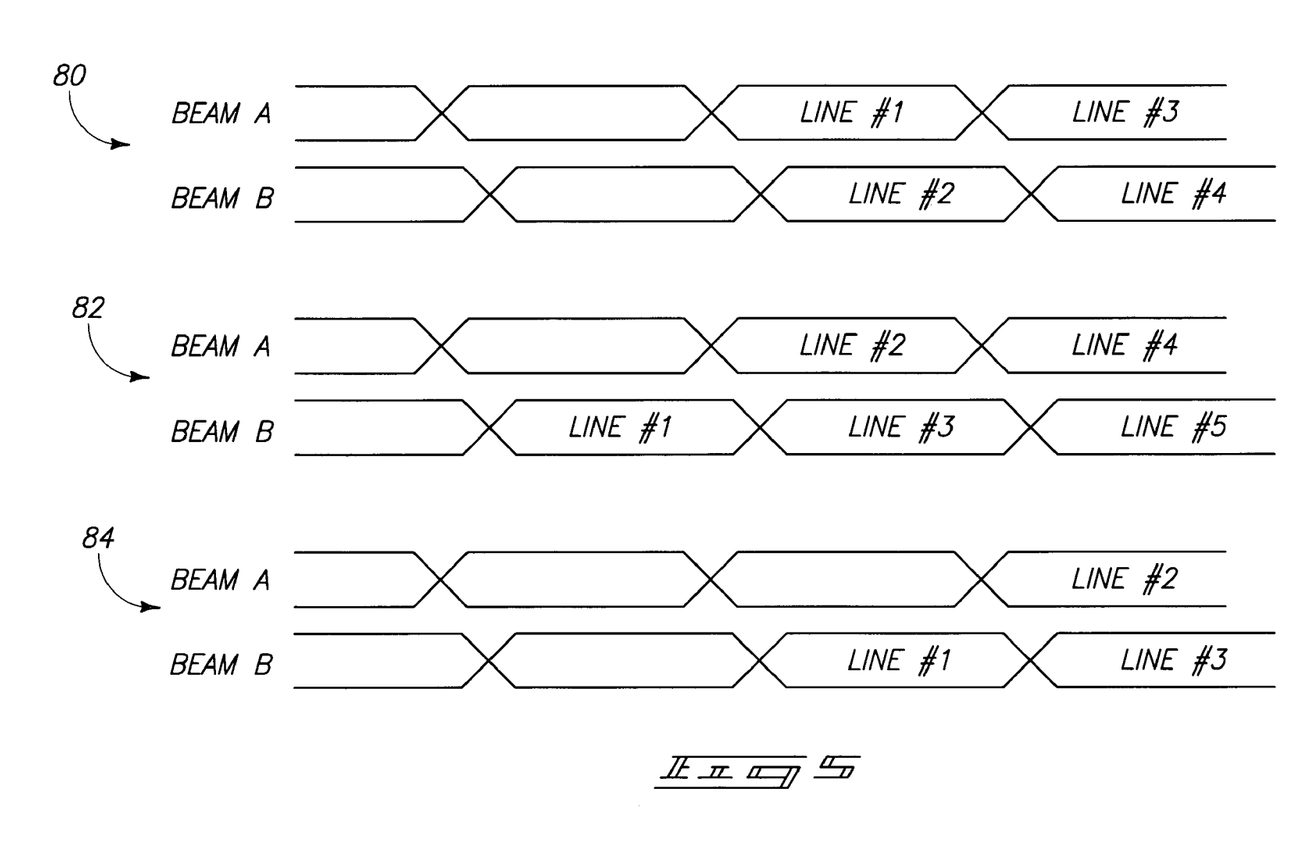
FIG. 5 is a timing diagram illustrating exemplary imaging operations of a plurality of light sources according to a plurality of embodiments.

Referring to FIG. 5, exemplary selection of light sources 40, 42 for imaging a first scan line comprising data of a latent image is described. In one arrangement, the light sources 40, 42 may be configured to generate the scan lines according to a default arrangement wherein light source 40 generates odd scan lines and light source 42 generates even scan lines. Responsive to the alignment determination, it may be desired to switch the generation of the scan lines from the default configuration to a configuration wherein light source 40 generates even scan lines and light source 42 generates odd scan lines to reduce the color plane registration error as described above. The switch may be implemented in one embodiment by delaying or advancing the first scan line to comprise information or data by one line, also resulting in the adjustment of the remaining scan lines of the respective latent image being formed in one embodiment.

The illustrated first pair of light beams 80 illustrates line assignments of the default arrangement wherein beam A generates the first scan line (odd scan lines) and beam B generates the second scan line (even scan lines) of the latent image.

The second and third pair of light beams 82, 84 illustrate exemplary line assignments for shifting of image data written using the light beams 41, 43 to write data of the scan lines. Second pair of light beams 82 illustrates advancement of the first scan line and third pair of light beams 84 represents delaying of the first scan line.

The shifting may be accomplished by writing of a blank line of data using processing circuitry 22 to the top of the latent image for light source 42 corresponding to beam A. The writing of the blank line shifts the latent image to reside on an odd boundary in the described embodiment. Thereafter, a two-line shift of image data of both beams A, B may be implemented to obtain a first line advancement or delay as desired. In some configurations, the advancement or delay implemented by processing circuitry 22 may be programmable. Other configurations may implement only one direction of adjustment. One exemplary configuration provides an advancement operation.

At least one embodiment enables image engine process speeds to be increased through the use of dual laser beams without an associated increase in color plane registration error and the degraded print quality. In one embodiment, the enablement of selection of one of the plural light sources to create the first scan line of individual color planes limits maximum inherent color plane registration error of imaging device 10 to that of single beam laser imaging devices. Accordingly, exemplary embodiments of the disclosure reduce maximum inherent color plane registration error by fifty percent by allowing the light source closest to the first line of the previous imaged color plane to create the first scan line of a subsequent plane.

Figure 6:
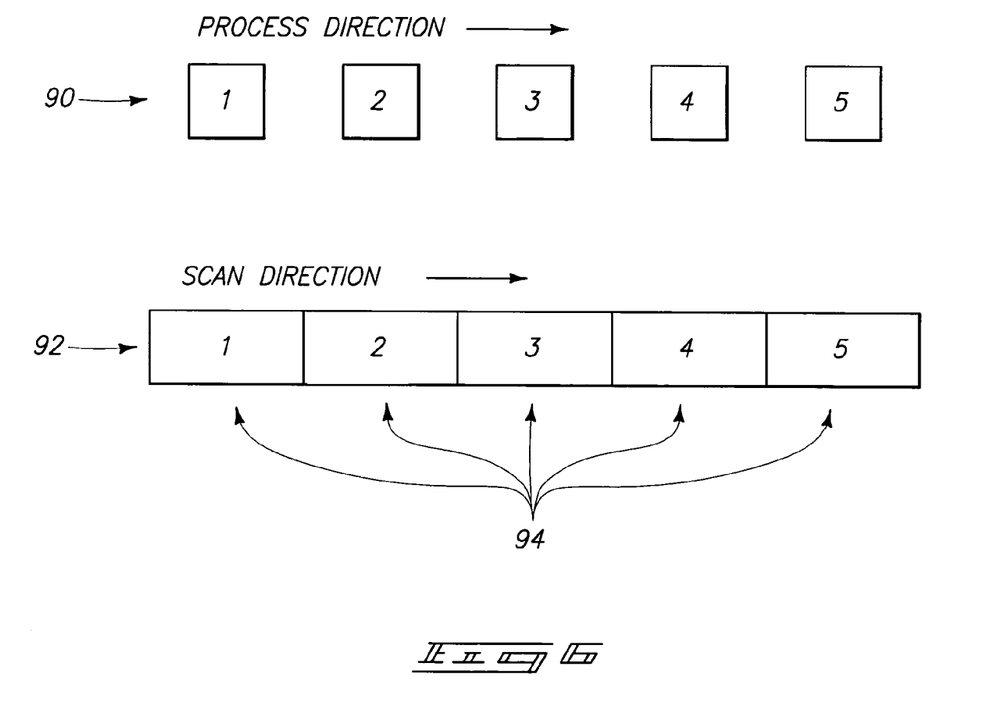
FIG. 6 is an illustrative representation depicting exemplary light source selection according to one embodiment.

Referring to FIG. 6, some configurations of imaging device 10 comprise more than two light sources. For example, in the configuration of FIG. 6, five light sources 90 are shown configured to simultaneously emit light beams to form scan lines of latent images upon a photoconductor. According to one embodiment, a horizontal scan cycle 92 of the photoconductor may be divided into a plurality of sections 94 (e.g., five) corresponding to the number of light sources 90. In one embodiment, a width of an individual section 94 (in time Ts) may be defined as Ts=cycle_time/n wherein cycle_time is equal to the time to scan a horizontal scan line and n is equal to the number of light sources 90.

The sections 94 may be ordered in sequence from the first section of the horizontal scan cycle 92 to be imaged in the scan direction to the last section of the horizontal scan cycle 92 to be imaged in the scan direction. The light sources 90 may also be ordered in sequence from the first light source to scan a line on the photoconductor during rotation in the process direction to the last light source to scan a line on the photoconductor. The ordered sections 94 respectively correspond to the ordered light sources 90 in the described embodiment.

Processing circuitry 22 is configured to monitor a position of the transfer system (e.g., top-of-page) with respect to sections 94. In one example, a beam from one of the light sources 90 corresponding to the section 94 in which a top-of-page or other desired position detection occurred may be selected to image a first line of the next latent image to be formed and the remaining light sources 90 may follow in order. For example, if a top-of-page or other desired position of the transfer system is detected during a second section 94 of the horizontal scan cycle 92, then the second of the light sources 90 may be selected to image the first line of the next latent image to be formed.

In one arrangement, processing circuitry 22 may measure a period of time (Tm) after the detection of the position of the transfer system (e.g., top-of-page) with respect to the next beam detect. Tm may be divided by the time of an individual section Ts and the result may be subtracted from the number of beams n to determine the appropriate section 94 and select the appropriate light source 90. For example, if Tm is measured to be 3.5, cycle_time is 5, Ts is 1 and n is 5, then the result would be 1.5 intermediate 1 and 2 corresponding to the second section 94 and resulting in the selection of the second light source 90 to image the first scan line of the next latent image to be formed. Other embodiments for selection are possible.

Color plane registration error may be caused by several different factors. One cause may be the resolution of the print engine in the process direction is not sufficiently fine. Many laser printers today use two laser beams instead of one so that two lines can be generated concurrently. When this technique is used, the maximum inherent color plane registration (CPR) error is a potential plus or minus one line if one laser is fixed to print the first and all the odd lines of each color plane degrading print quality. At least one embodiment of the disclosure reduces color plane registration (CPR) error to a potential plus or minus 0.5 line.

The protection sought is not to be limited to the disclosed embodiments, which are given by way of example only, but instead is to be limited only by the scope of the appended claims.

What is claimed is:

1. An imaging device comprising:
a plurality of light sources configured to emit a plurality of light beams used to form latent images for the formation of images upon media;
a photoconductor configured to provide the latent images corresponding to the images;
a scanning device configured to scan the light beams on the photoconductor to form the latent images;
a developing system configured to develop the latent images using at least one marking agent;
a transfer system configured to transfer the marking agent of the latent images to the media; and
a control system coupled with the light sources and configured to monitor positional information of at least one of the lights beams with respect to the photoconductor and to monitor positional information of the transfer system and to select one of the light sources to generate a light beam comprising data for a first scan line of one of the latent images and to select the other of the light sources to generate a light beam comprising data for a first scan line of an other of the latent images to be formed, and wherein the control system is configured to select the one and the other of the light sources responsive to processing of the positional information.

2. The device of claim 1 wherein the control system is configured to select to reduce color plane registration error of a color electrophotographic imaging process.

3. The device of claim 1 wherein the developing system is configured, for a single sheet of media, to develop an entirety of a first one of the latent images for the single sheet of media before development of an entirety of a second one of the latent images for the single sheet of media.

4. The device of claim 1 wherein a horizontal scan cycle of the photoconductor comprises a plurality of sections corresponding to respective ones of the light sources, and the monitoring the positional information comprises detecting a position of the transfer system with respect to the sections and the control system is configured to select the one and the other of the light sources responsive to the detecting.

5. A scanning system comprising:
a first light source configured to emit a first light beam;
a second light source configured to emit a second light beam;

a first sensor configured to detect a position of at least one of the first and the second light beams with respect to a photoconductor;

a second sensor configured to provide positional information of a transfer system; and a control system coupled with the first sensor and the second sensor and configured to select one of the first light source and the second light source to form a first scan line of a latent image on the photoconductor responsive to output of the first sensor and the second sensor.

6. The system of claim 5 wherein a developed image formed using the transfer system comprises one of a plurality of superimposed color planes of a color image.

7. The system of claim 5 wherein the selection delays or advances the formation of the first scan line.

8. The system of claim 5 wherein the control system is configured to select the second light source and to write a blank line of data for the first light source immediately preceding the first scan line formed by the second light source.

9. The system of claim 5 wherein the first light source and the second light source are configured to simultaneously emit the first light beam and the second light beam to form a plurality of scan lines of a single latent image.

10. The system of claim 5 wherein the control system is configured to select responsive to output of the first and the second sensor following the formation of another latent image immediately preceding the latent image to be scanned.

11. The system of claim 5 wherein the first sensor comprises a beam detect sensor and the second sensor comprises a top of page sensor.

12. A scanning system comprising:

a control system configured to control emission of a plurality of light beams from a plurality of light sources to generate a plurality of scan lines of a plurality of latent images upon a photoconductor and to monitor alignment of the photoconductor with respect to a transfer system; and wherein, for individual ones of the latent images to be formed using the photoconductor, the control system is further configured to select from the plurality of light sources to form a first scan line of the individual latent image responsive to alignment of the photoconductor and the transfer system.

13. The system of claim 12 wherein the control system is configured to monitor alignment of a latent image upon the photoconductor with respect to a developed image upon the transfer system.

14. The system of claim 12 wherein the control system is configured to select the one or the other of the light sources which would result in the formation of a first line for a current developed image closest to a first line of a previously developed image located upon the transfer system.

15. The system of claim 12 wherein, for a single image to be formed, the control system is configured to select one of the light sources to form the first scan line of a first latent image of the single image and to select the other of the light sources to form the first scan line of a second latent image of the single image.

16. The system of claim 12 wherein the control system is configured to one of delay or advance the formation of the first scan line responsive to the alignment.

17. The system of claim 16 wherein the control system is configured to write a blank line of data to implement the delay or advance.

18. The system of claim 12 wherein the first light source and the second light source are configured to simultaneously emit the first light beam and the second light beam to form a plurality of scan lines of a single latent image.

19. The system of claim 12 wherein the control system is configured to select responsive to positional information of the photoconductor and the transfer system obtained following the formation of another latent image immediately preceding the latent image to be scanned.

20. An imaging device scanning system comprising:

means for emitting a first light beam to form some scan lines of a plurality of latent images during an electrophotographic imaging process, wherein the latent images correspond to an image to be formed upon a sheet of media;

means for emitting a second light beam to form other scan lines of the latent images of the electrophotographic imaging process; and means for selecting, for individual ones of the latent images, one of the means for emitting the first light beam and the means for emitting the second light beam for imaging a first of the scan lines comprising data to be formed as the respective image upon the respective sheet of media.

21. An article of manufacture comprising:

processor-usable media comprising programming configured to cause processing circuitry to:

control emission of a light beam from a first light source wherein the light beam from the first light source is used to create some scan lines of a latent image during an electrophotographic imaging process;

control emission of a light beam from a second light source wherein the light beam from the second light source is used to create other scan lines of the latent image; and wherein the programming is further configured to cause the processing circuitry to control the emission of the light beams from respective ones of the first and the second light sources for the respective ones of the some and others of the scan lines to reduce color plane registration error of an image formed using the latent image.

22. A method comprising:

scanning a first light beam and a second light beam to create a plurality of latent images upon a photoconductor; and for individual ones of the latent images, selecting one of the first and the second light sources to emit the light beam for a first scan line for the respective latent image, the selecting comprising monitoring alignment of the photoconductor and a transfer system configured to transfer a developed latent image from the photoconductor to a sheet of media.

23. The method of claim 22 wherein the monitoring comprises monitoring alignment of a latent image upon the photoconductor with respect to a developed image upon the transfer system.

24. The method of claim 22 wherein the selecting comprises selecting to reduce color plane registration error of a color electrophotographic imaging process.

25. The method of claim 22 wherein the plurality of the latent images correspond to a color image to be formed upon a single sheet of media, and the selecting comprises selecting the first light source for a first scan line of a first of the latent images and selecting the second light source for a first scan line of a second of the latent images.

26. The method of claim 22 wherein the plurality of the latent images correspond to a color image to be formed upon a single sheet of media, and wherein an entirety of a first of the latent images is developed before development of an entirety of a second of the latent images for the single sheet of media.

27. An electrophotographic imaging method comprising:
emitting a plurality of light beams using a plurality of light sources to form a plurality of latent images during an electrophotographic imaging process, wherein the latent images correspond to an image to be formed upon a sheet of media;
monitoring imaging operations of the electrophotographic imaging process;
controlling one of the light sources to emit a light beam for a first scan line for one of the latent images; and
controlling an other of the light sources to emit a light beam for a first scan line for an other of the latent images, and wherein the controlling is responsive to the monitoring.

28. The method of claim 27 wherein the monitoring comprises monitoring in which half of a horizontal laser scan cycle a top of page signal of a transfer system occurs.

29. The method of claim 27 wherein the monitoring comprises monitoring alignment of a photoconductor and transfer system.

30. The method of claim 29 wherein the monitoring comprises monitoring a position of the transfer system with respect to a plurality of respective sections of a horizontal laser scan cycle of the photoconductor and corresponding to respective ones of the light sources, and wherein the controllings comprise controllings responsive to the position of the transfer system being detected with respect to the sections corresponding to the one and the other light sources, respectively.

31. The method of claim 30 wherein the emitting comprises emitting using more than two light sources.

32. The method of claim 27 wherein the controllings comprise controllings to reduce color plane registration error of a color electrophotographic imaging process.

33. The method of claim 27 wherein the one and the other latent images comprise latent images of a color image to be formed upon a single sheet of media.

34. The method of claim 27 wherein the controllings comprise controllings to one of delay or advance at least one of the first scan lines of the one and the other latent images.

35. The method of claim 27 wherein the emitting comprises simultaneously emitting the light beams from the light sources during the formation of scan lines of a single one of the latent images.

36. A method comprising:
detecting a transition in a signal indicative of a position of a transfer system with respect to a photoconductor scanning operation;
determining when the transition occurs within a scan cycle of the photoconductor scanning operation; and
selecting an individual one of a plurality of light beams for forming a first scan line of a latent image according to when the transition occurs within the scan cycle.

37. The method of claim 36 wherein the plurality of light beams include a first light beam and a second light beam, and the selecting includes selecting a first of the light beams if the transition occurs in a first half of the scan cycle and selecting a second of the light beams if the transition occurs in a second half of the scan cycle.

38. The method of claim 36 wherein the scan cycle includes a period of time between successive detections of one of the plurality of the light beams.

39. The method of claim 36 wherein the plurality of light beams includes 1 to n light beams, with n being greater than two, and with the scan cycle including n successive time intervals corresponding in order to respective ones of the 1 to n light beams, and the selecting includes determining in which of the n successive time intervals the transition occurred and selecting a corresponding one of the 1 to n light beams for forming the first scan line responsive to the determining.

* * * * *